Patented Dec. 13, 1927.

1,652,587

UNITED STATES PATENT OFFICE.

STANLEY D. SHIPLEY, OF STAMFORD, CONNECTICUT, ASSIGNOR TO ATLAS POWDER COMPANY, OF WILMINGTON, DELAWARE, A CORPORATION OF DELAWARE.

PROCESS FOR REDUCING THE VISCOSITY AND INCREASING THE SOLUBILITY OF NITROCELLULOSE.

No Drawing. Application filed June 9, 1922. Serial No. 567,171.

When dissolving nitrocellulose, celluloid, acetyl cellulose, and other cellulose-esters in their solvents, as for instance, ether-alcohol, amyl acetate, butyl acetate, ethyl acetate, methyl acetate, ketones and all other solvents of said cellulose-esters, very viscous solutions are obtained which, even in case of a small percentage of dissolved substance, are so thick that they are incapable of flowing.

The object of my present process is to provide means whereby it will be possible to reduce the viscosity and increase the solubility of nitrocellulose and other cellulose esters before being dissolved in their several solvents. By this process, for instance, easily flowing solutions of cellulose esters in various solvents may be obtained, such solutions otherwise being too viscous to use.

I have discovered that nitrocellulose and some other cellulose esters have their viscosities permanently lowered when heated in water and other nonsolvent liquids, or liquids of low solvent capacity, with or without pressure. The heating may be performed within a wide range of temperatures. The time of heating will vary with the temperature used, the nature of the material treated, and the degree of solubility required.

Furthermore, I have discovered that the heating or boiling of the nitrocellulose in water or other solvent or nonsolvent liquid and in the presence of a catalyzing agent will produce better results from the standpoint of reduction of viscosity and increase of solubility than when the heating alone is relied upon.

The catalytic action may be secured by using a container of or lined with a suitable metal, aluminum being the best so far discovered by me, or the catalyst may be placed in the container along with the nitrocellulose in the form of a powder or granular mass. Other catalysts that I have used include silver, glass, wood, nickel, iron, gold, copper, lead, tin and zinc.

I have further found that the presence of a salt, such as soda ash during the heating of the nitrocellulose speeds up the lowering of viscosity.

The invention may be carried out, for instance, in the following manner:—

The nitrocellulose is confined in a wood or metal container, in order to prevent the escape of the non-solvent liquid, and then subjected to heating. The heating temperature has a certain relation to the duration of the heating:—the longer and the more intensively the heating is affected the greater is the reduction in viscosity. Thus untreated nitrocellulose which would give an almost solid solution in amyl acetate or other solvent, would become as fluid as water if the nitrocellulose is treated by the above mentioned process before being dissolved in the solvent. Nitrocellulose, thus treated, has no properties changed except the viscosity and solubility.

The viscosity of nitrocellulose and some other cellulose-esters, is economically reduced by the process above mentioned, their solutions flowing freely, and may be readily filtered free from impurities, a result of great importance in most technical proceedings, where such solutions are used.

As an example of the application of this process:—

If it is desired to produce a nitrocellulose so modified in its characteristics that a 25 percent solution in ordinary nitrocellulose solvents will have a viscosity sufficient that it may be used in an air brush or spray, I would produce it in one of the two following methods:—

(a) The nitrocellulose would be placed in a suitable vessel and boiled with water for approximately 200 hours and would thereafter be dissolved in a suitable liquid solvent whether a commonly recognized solvent or one in which the nitrocellulose has been rendered solvent by such boiling.

(b) The nitrocellulose would be placed in a suitable closed kettle, or autoclave, and heated at a pressure of fifteen pounds per square inch, corresponding to a temperature of about 121° centigrade, for twenty hours and thereafter be dissolved in a suitable liquid solvent whether a commonly recognized solvent or one in which the nitrocellulose has been rendered solvent by such heating.

In giving these examples, I do not care to limit myself as to temperatures, pressures. nor times of heating, as there is a wide range in each of these three conditions. The temperature may be anywhere between 60° centigrade and the decomposition point of the nitrocellulose. As an illustration of the modification in the material brought about by the action of the catalyst I give below the results of two tests made by me.

*Test 1.—Nitrocellulose.*

| Container made of | Acetone solution. | Viscosity after | | |
|---|---|---|---|---|
| | | 8 hrs. | 16 hrs. | 24 hrs. |
| Aluminum | 6 oz | 33 | 9.2 | 4.0 |
| Silver | 6 oz | 35 | 10.4 | 4.8 |
| Glass | 6 oz | 37 | 10.0 | 5.2 |
| Wood | 6 oz | 38 | 11.6 | |
| Nickel | 6 oz | 40 | 11.6 | |
| Iron | 6 oz | 41 | 11.6 | 5.0 |
| Gold | 6 oz | 41 | 10.4 | 5.4 |
| Copper | 6 oz | 45 | 11.6 | 5.2 |
| Lead | 6 oz | 45 | 12.4 | 6.4 |

The figures under the heading "Viscosity after" refer to the viscosity of the material as compared with water. For example, the solution after 8 hours heating in an aluminum container has a viscosity thirty-three times that of water; after 24 hours heating its viscosity is reduced to four times that of water.

*Test 2.*

| Container. | Ash blend. | Acetone solution. | Viscosity. | | | Remarks. |
|---|---|---|---|---|---|---|
| | | | 8 hrs. | 16 hrs. | 24 hrs. | |
| Aluminum | 167 | 6 oz | 20.0 | 9.6 | 5.2 | Solution clear. |
| Tin | 167 | 6 oz | 20.8 | 10.0 | 5.2 | White precipitate. |
| Zinc | 167 | 6 oz | 21.2 | 10.2 | 5.6 | Solution clear. |
| Lead | 167 | 6 oz | 25.2 | 12.0 | 6.4 | Little cloudy. |

In boiling nitrocellulose in water or other solutions of low solvent power, I may, if desired, add an ingredient such as calcium chloride which will increase the boiling point of the water. This is desirable since it provides means for securing increased temperature without increased pressure. Some of the compounds of cellulose adapted to be modified by my process are of a highly explosive nature under certain conditions. For example, large quantities of smokeless powder are now available as scrap material, since the World War, and this material is adapted to be treated by my process. It is well known that smokeless powder is explosive only when confined or under pressure. At atmospheric pressure or in the open air it will burn without exploding. Therefore, the step of increasing the boiling point of the water renders it possible to subject nitrocellulose of this character to increased temperature without increasing the pressure and consequently the factor of safety is correspondingly increased.

Having described my invention what I claim is:

1. The herein described process of making nitrocellulose solutions of low viscosity and high concentration which consists of heating the nitrocellulose in a non-solvent liquid and in the presence of aluminum as a catalyzing agent.

2. The herein described process of manufacturing nitrocellulose solutions of low viscosity and high concentration which consists of heating nitrocellulose in water and in the presence of a substance which raises the boiling point of the water.

3. The herein described process of manufacturing nitrocellulose solutions of low viscosity and high concentration which consists of heating nitrocellulose in water and in the presence of a substance which raises the boiling point of the water and in the presence of a catalyzing agent.

4. The herein described process of manufacturing nitrocellulose solutions having sufficient fluidity to be used as a lacquer or spray, which consists of subjecting nitrocellulose and a liquid to the action of heat and in the presence of an alkali metal salt.

5. The herein described process of reducing the viscosity of nitrocellulose which consists of subjecting the nitrocellulose and a liquid to the action of heat in the presence of soda ash.

6. The herein described process of manufacturing nitrocellulose solutions of low viscosity and high concentration, which consists of heating nitrocellulose in a non-solvent aqueous liquid and in the presence of a substance which raises the boiling point of the said liquid.

7. The herein described process of manufacturing nitrocellulose solutions of low viscosity, which consists of subjecting nitrocellulose and water to the action of heat and in the presence of a salt having an alkaline reaction.

8. The herein described process of manufacturing nitrocellulose solutions of low viscosity which consists of heating nitrocellulose in water in the presence of soda ash.

In testimony whereof he affixes his signature.

STANLEY D. SHIPLEY.